US011963651B2

(12) United States Patent
Zuo et al.

(10) Patent No.: US 11,963,651 B2
(45) Date of Patent: Apr. 23, 2024

(54) AUTONOMOUS CLEANING DEVICE AND NOISE REDUCTION AIR DUCT DEVICE THEREOF

(71) Applicants: Beijing Shunzao Technology Co., Ltd., Beijing (CN); BEIJING XIAOMI MOBILE SOFTWARE CO., LTD., Beijing (CN)

(72) Inventors: Yongcheng Zuo, Beijing (CN); Cheng Tang, Beijing (CN); Fei Duan, Beijing (CN); Liang Zhong, Beijing (CN); Shan Gao, Beijing (CN); Tiantian Zhang, Beijing (CN)

(73) Assignees: Beijing Shunzao Technology Co., Ltd., Beijing (CN); BEIJING XIAOMI MOBILE SOFTWARE CO., LTD., Beijing (CN)

( * ) Notice: Subject to any disclaimer, the term of this patent is extended or adjusted under 35 U.S.C. 154(b) by 171 days.

(21) Appl. No.: 17/707,921

(22) Filed: Mar. 29, 2022

(65) Prior Publication Data

US 2023/0008598 A1 Jan. 12, 2023

(30) Foreign Application Priority Data

Jul. 7, 2021 (CN) ......................... 202110768862.9

(51) Int. Cl.
*A47L 9/00* (2006.01)
*A47L 9/28* (2006.01)
*G10K 11/178* (2006.01)

(52) U.S. Cl.
CPC ............... *A47L 9/0081* (2013.01); *A47L 9/28* (2013.01); *G10K 11/17861* (2018.01); *A47L 2201/00* (2013.01)

(58) Field of Classification Search
CPC ...... A47L 2201/00; A47L 9/28; A47L 9/0081; G10K 11/17861
See application file for complete search history.

(56) References Cited

U.S. PATENT DOCUMENTS 5,499,423 A * 3/1996 Joo .................. G10K 11/17861 381/71.5

FOREIGN PATENT DOCUMENTS

CN 206102556 U 4/2017
CN 111603097 A * 9/2020

(Continued)

OTHER PUBLICATIONS

CN-111603097-A—English Machine Translation (Year: 2020).*

(Continued)

*Primary Examiner* — Marc Carlson
(74) *Attorney, Agent, or Firm* — Arch & Lake LLP

(57) ABSTRACT

An autonomous cleaning device and a noise reduction air duct device are provided for autonomous cleaning device. The autonomous cleaning device includes a body and a motor arranged on the body, and the noise reduction air duct device is mounted on the body. The noise reduction air duct device includes an upper housing, a lower housing and a support noise reduction structure made of elastic material. The lower housing and the upper housing enclose to form an air duct, an air inlet is arranged at a position of the air duct corresponding to the motor, and an air outlet is arranged on a side of the air duct away from the air inlet; the support noise reduction structure has a first end fixed on the lower housing, and a second end abutting against a lower surface of the upper housing.

18 Claims, 9 Drawing Sheets

(56) References Cited

FOREIGN PATENT DOCUMENTS

| | | | | | |
|---|---|---|---|---|---|
| CN | 111603097 | A | | 9/2020 | |
| CN | 211674025 | U | | 10/2020 | |
| CN | 211674060 | U | | 10/2020 | |
| CN | 112656312 | A | * | 4/2021 | |
| CN | 112656312 | A | | 4/2021 | |
| CN | 113576312 | A | * | 11/2021 | ........... A47L 9/0081 |
| JP | S53122375 | U | | 9/1978 | |
| JP | 2018185727 | A | | 11/2018 | |
| KR | 20130012487 | A | | 2/2013 | |
| KR | 20180010703 | A | | 1/2018 | |

OTHER PUBLICATIONS

First Office Action of the Chinese application No. 202110768862.9 dated Mar. 3, 2022 with English translation, (14p).
JPOA of Application No. 2022-054441 dated on May 9, 2023 with English translation, (12p).
Extended European Search Report issued in Application No. 22165347.0, dated Oct. 18, 2022,(8p).
Office Action in Application No. 10-2022-0036542 from Korean Patent Office, issued on Jan. 18, 2024.(13P).

* cited by examiner

AUTONOMOUS CLEANING DEVICE AND NOISE REDUCTION AIR DUCT DEVICE THEREOF

CROSS-REFERENCE TO RELATED APPLICATION

The present application is based upon and claims the priority to Chinese Application No. 202110768862.9, filed on Jul. 7, 2021, the content of which is incorporated herein by reference in its entirety for all purposes.

FIELD

The present disclosure relates to a technical field of household appliances, and more particularly to an autonomous cleaning device and a noise reduction air duct device thereof.

BACKGROUND

Generally, autonomous cleaning device cleans specific areas such as houses and offices by sucking dust or foreign matters while moving.

SUMMARY

According to a first aspect of the present disclosure, a noise reduction air duct device for an autonomous cleaning device is provided. The autonomous cleaning device includes a body and a motor mounted on the body, the noise reduction air duct device is configured to be mounted on the body and the noise reduction air duct device includes an upper housing; a lower housing; and a support noise reduction structure. The support noise reduction structure is made of an elastic material, the lower housing and the upper housing enclose to form an air duct, a position of the air duct corresponding to the motor defines an air inlet, and a side of the air duct away from the air inlet defines an air outlet; and the support noise reduction structure has a first end fixed on the lower housing, and a second end abutting against a lower surface of the upper housing.

According to a second aspect of the present disclosure, an autonomous cleaning device is provided, including a body; a motor mounted on the body; and a noise reduction air duct device mounted on the body. The noise reduction air duct device includes an upper housing; a lower housing; and a support noise reduction structure. The support noise reduction structure is made of an elastic material, the lower housing and the upper housing enclose to form an air duct, a position of the air duct corresponding to the motor defines an air inlet, and a side of the air duct away from the air inlet defines an air outlet; and the support noise reduction structure has a first end fixed on the lower housing, and a second end abutting against a lower surface of the upper housing.

DETAILED DESCRIPTION

Reference Numerals

Figure 1:
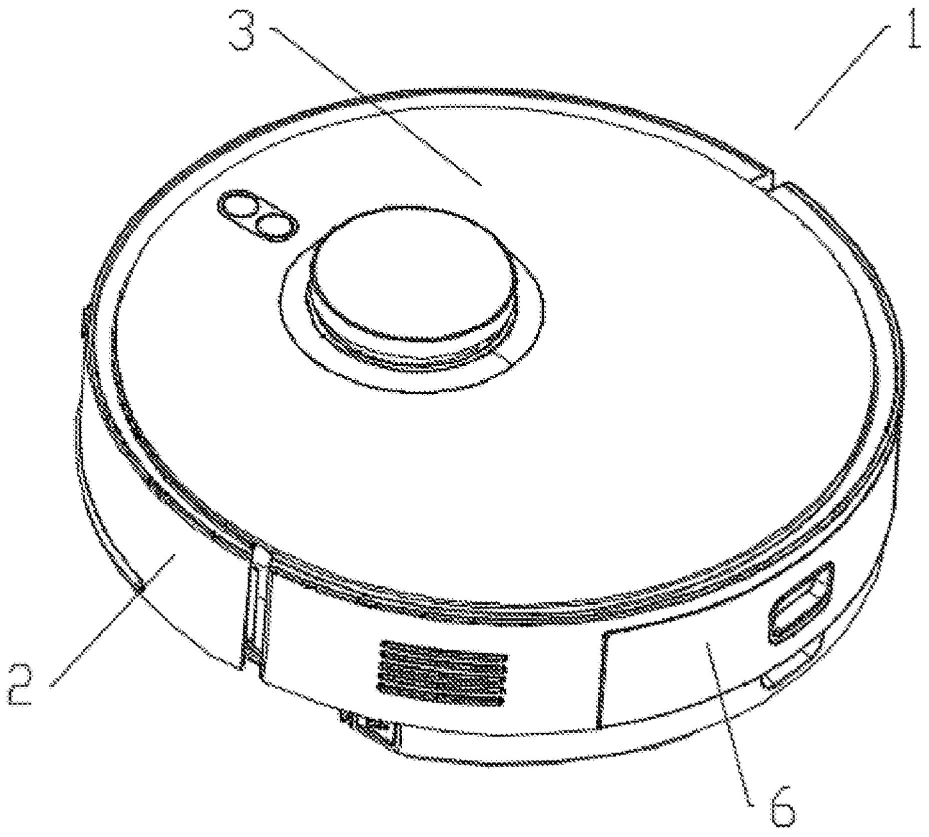
FIG. 1 is a perspective view of an autonomous cleaning device according to one or more examples of the present disclosure.

1. autonomous cleaning device; 2. body; 3. upper cover; 4. motor; 5. air outlet; 6. dust box; 7. air duct assembly; 8. upper housing; 9. lower housing; 10. air inlet; 11. airflow buffer; 12. support noise reduction structure; 13. exhaust port; 14. active noise reduction; 15. first inclined portion; 16. second inclined portion; 17. third inclined portion; 18. fourth inclined portion; 19. vibration-damping structure.

In order to better explain the present disclosure and facilitate understanding, the present disclosure is described in detail through specific embodiments in combination with the accompanying drawings. Terms such as "up", "down" and other directional nouns mentioned in the present disclosure refer to orientations in FIG. 1.

The autonomous cleaning device includes a unit of an ordinary vacuum cleaner for sucking dust or foreign matters, a mobile unit for moving the autonomous cleaning device, a detection sensor for detecting various obstacles in an area to be cleaned, and a controller for performing cleaning operations. The controller controls the mobile unit and the detection sensor to clean.

The autonomous cleaning device travels in the area to be cleaned, such that a floor may be cleaned autonomously without user's operation. In an example, the autonomous cleaning device may have an effect of removing dust or cleaning the house floor. The dust herein may include, for example, dust, dirt, powder and debris.

The autonomous cleaning device includes a vacuum device to form a vacuum state. Solid particles are drawn into a dust box through a vacuum suction port. A filter in the dust box filters airflow, and the airflow passes through an air duct to enter a vacuum generator (motor) and then is discharged out of the autonomous cleaning device. In a related art, when the autonomous cleaning device cleans in a high-power mode, due to an increased vacuum degree, enhanced friction and impact between the airflow and the air duct cause a large physical vibration, resulting in loud noise and affecting the user experience.

Thus, there is an urgent need to provide an autonomous cleaning device capable of reducing noise and a noise reduction air duct device thereof.

In view of the above shortcomings and deficiencies in a related art, the present disclosure provides an autonomous cleaning device and a noise reduction air duct device thereof, which solves the technical problems that an existing autonomous cleaning device working in the high-power mode produces loud noise.

The following is the beneficial effect of the present disclosure: the noise reduction air duct for the autonomous cleaning device of the present disclosure is provided with the support noise reduction structure between the upper housing and the lower housing, compared with the related art, the noise reduction air duct of the autonomous cleaning device may absorb the vibration of the upper housing when the airflow passes through, and achieve the effect of reducing the operational noise of the vacuum device.

The present disclosure further improves the structure of the noise reduction air duct. By providing the airflow buffer and the exhaust port, the impact of the airflow is reduced, and the friction between the airflow and the air duct is also reduced, thereby reducing the noise generated during cleaning.

Figure 2:
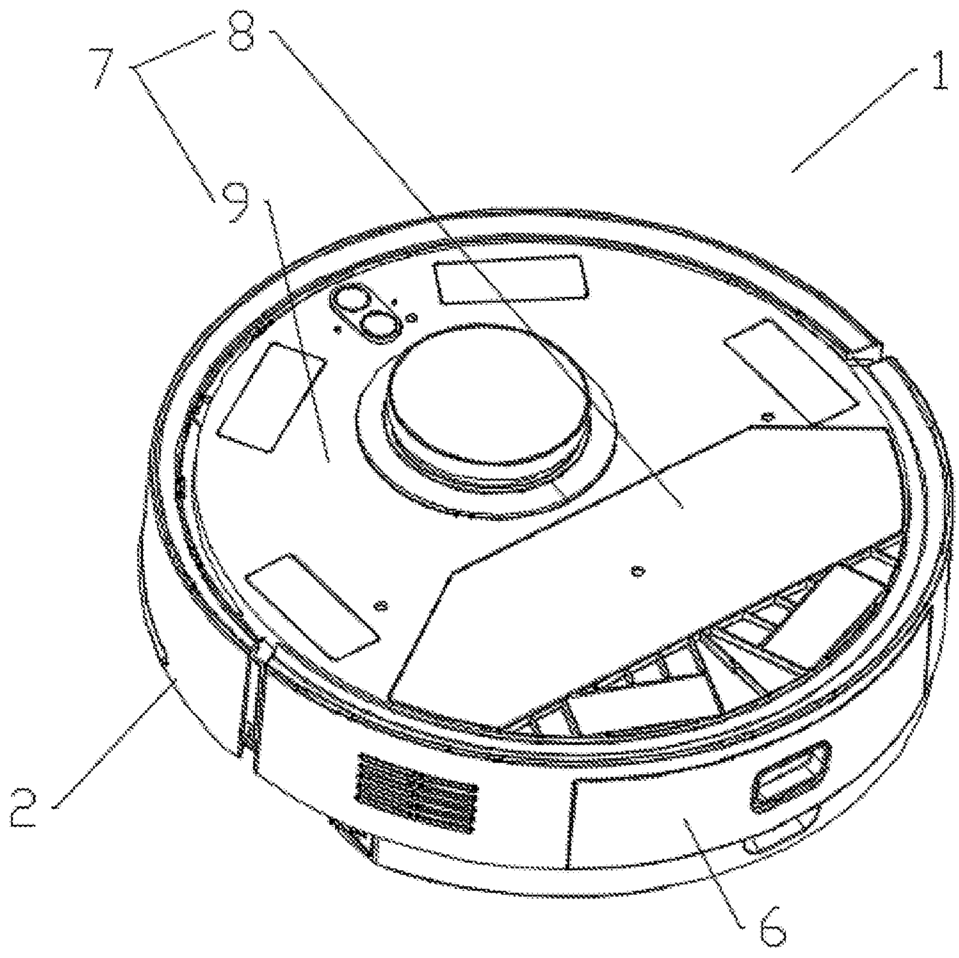
FIG. 2 is a perspective view of an autonomous cleaning device according to one or more examples of the present disclosure, in which the autonomous cleaning device is not mounted with an upper cover.
Figure 3:
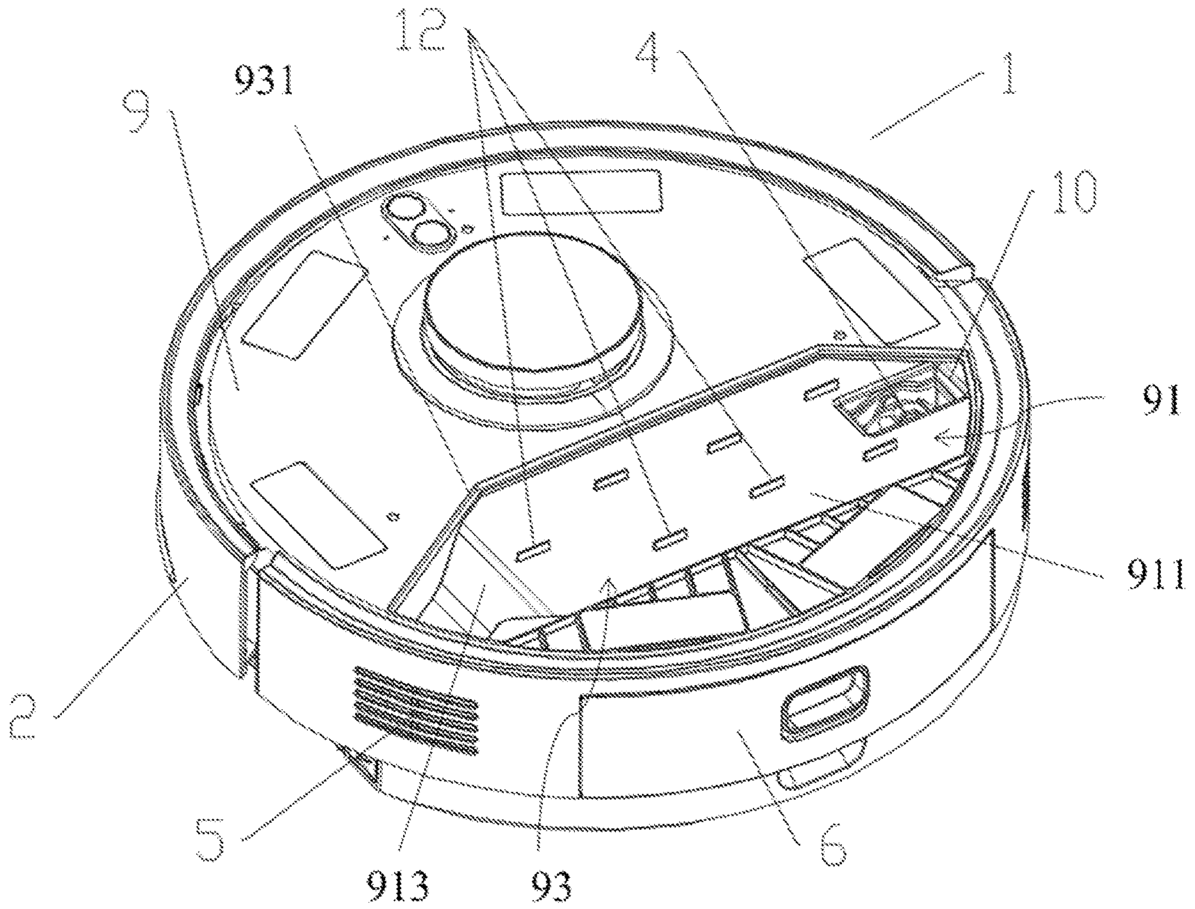
FIG. 3 is a perspective view of an autonomous cleaning device according to one or more examples of the present disclosure, in which the autonomous cleaning device is not mounted with an upper cover and an upper housing of an air duct assembly.

Referring to FIG. 1, FIG. 2 and FIG. 3, examples of the present disclosure provide a noise reduction air duct device for an autonomous cleaning device. The autonomous cleaning device 1 includes a body 2, a noise reduction air duct device and an upper cover 3. The body 2 is provided with a dust box 6 and a motor 4, the noise reduction air duct device is mounted on the body 2, and the upper cover 3 covers the noise reduction air duct device. The motor 4 is a vacuum-pumping motor for sucking solid particles on the ground.

The noise reduction air duct device includes an air duct assembly 7, and the air duct assembly 7 includes an upper housing 8, a lower housing 9 and a support noise reduction structure 12 made of elastic material. The lower housing 9 and the upper housing 8 enclose to form an air duct 91.

An air inlet 10 is arranged at a position of the lower housing 9 corresponding to the motor 4, and an air outlet 5 is arranged on a side of the lower housing 9 away from the air inlet 10.

An end of the support noise reduction structure 12 is fixed on the lower housing 9, and the other end of the support noise reduction structure 12 abuts against a lower surface of the upper housing 8.

Further, the lower housing 9 is fixed to the body 2, the lower housing 9 defines a groove 93, the upper housing 8 is mounted at an opening 931 of the groove 93, and an end of the support noise reduction structure 12 is fixed on a bottom face of the groove 93.

Along a flow direction of airflow in the air duct 91, the air duct 91 is divided into an upstream air duct 911 and a downstream air duct 913. A plurality of support noise reduction structures 12 are mounted in the upstream air duct 911, and the support noise reduction structures 12 are arranged between the bottom face of the groove 93 and the upper housing 8. An end of the support noise reduction structure 12 is fixed on the bottom face of the groove 93 of the lower housing 9, and the other end of the support noise reduction structure 12 abuts against the lower surface of the upper housing 8. The support noise reduction structure 12 forms an elastic support for the upper housing 8 to absorb the vibration of the upper housing 8 when the airflow passes through to reduce the noise. A cross section of the upstream air duct 911 perpendicular to the flow direction of the airflow is strip-shaped, such that the manufacturing and processing of the upstream air duct 911 are simple, and the friction resistance of the upstream air duct 911 to the airflow is low.

The support noise reduction structure 12 is sheet-shaped, made of sound deadening material and arranged along the airflow direction, which is conducive to guiding the airflow to the downstream air duct 913. In addition, there are three or more support noise reduction structures 12, and the number of the support noise reduction structures 12 close to the air inlet 10 is greater than the number of the support noise reduction structures close to the downstream air duct 913. Speed of the airflow at the air inlet 10 is higher than speed of the airflow close to the downstream air duct 913. The arrangement of more support noise reduction structures 12 may better absorb the vibration from the upper housing 8 at the air inlet 10, to reduce the noise.

Further, the support noise reduction structure 12 is made of Expanded Polypropylene (EPP) noise reduction material, and a surface of the groove 93 of the lower housing 9 and a lower surface of the upper housing 8 are coated with EPP noise reduction material. It should be noted that EPP is a polypropylene plastic foaming material, which has excellent sound insulation and absorption effect, and has the advantages of light specific gravity, good elasticity, shock resistance and compression resistance, high deformation recovery rate, good absorption performance, resistance to various chemical solvents, insulation, heat resistance, environmental protection and so on.

In addition, in order to further reduce the friction between the airflow and the air duct 91, a corner of the air duct 91 is rounded for a smooth transition.

Figure 4:
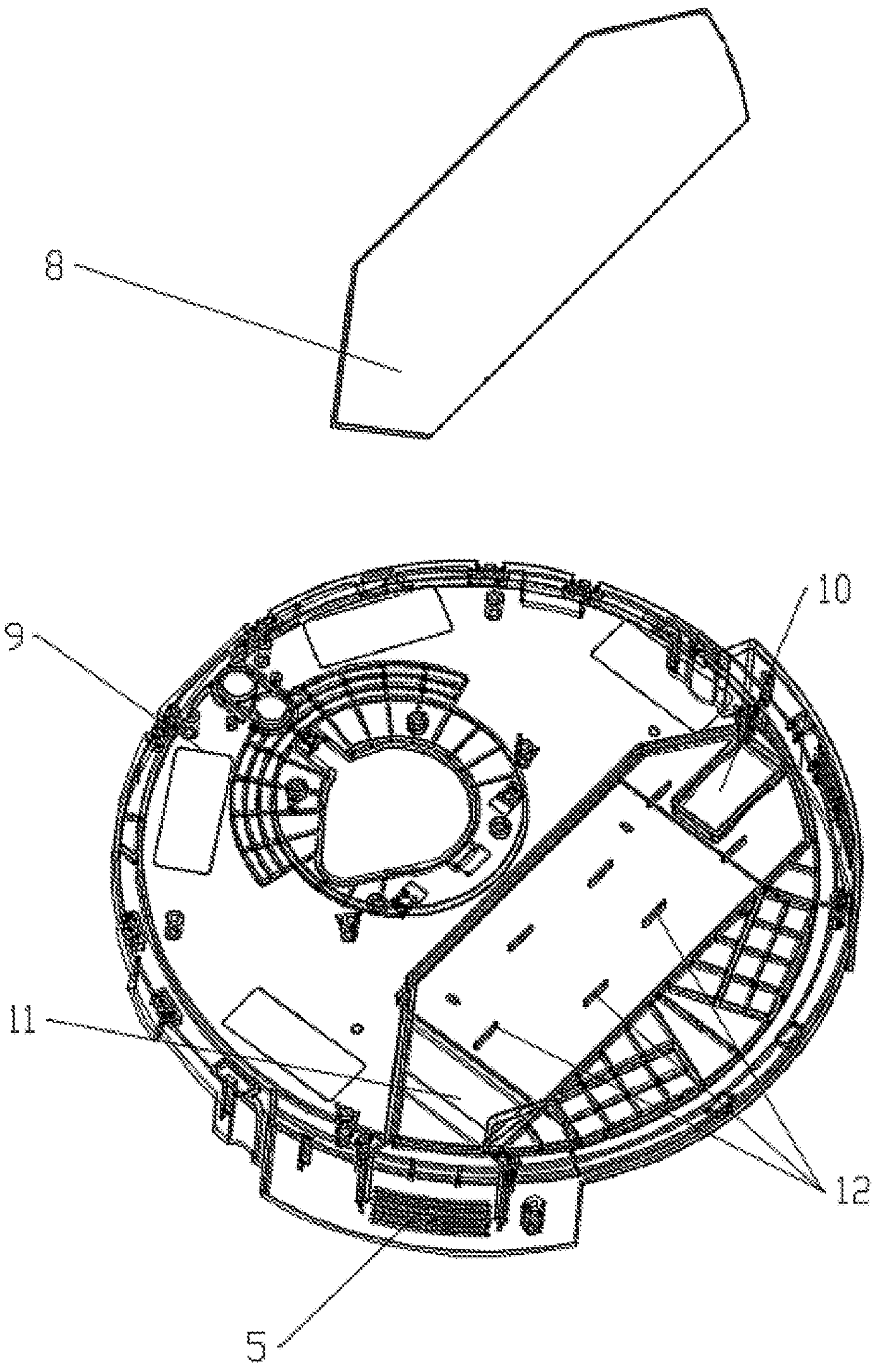
FIG. 4 is an exploded view of an air duct assembly according to one or more examples of the present disclosure.
Figure 5:
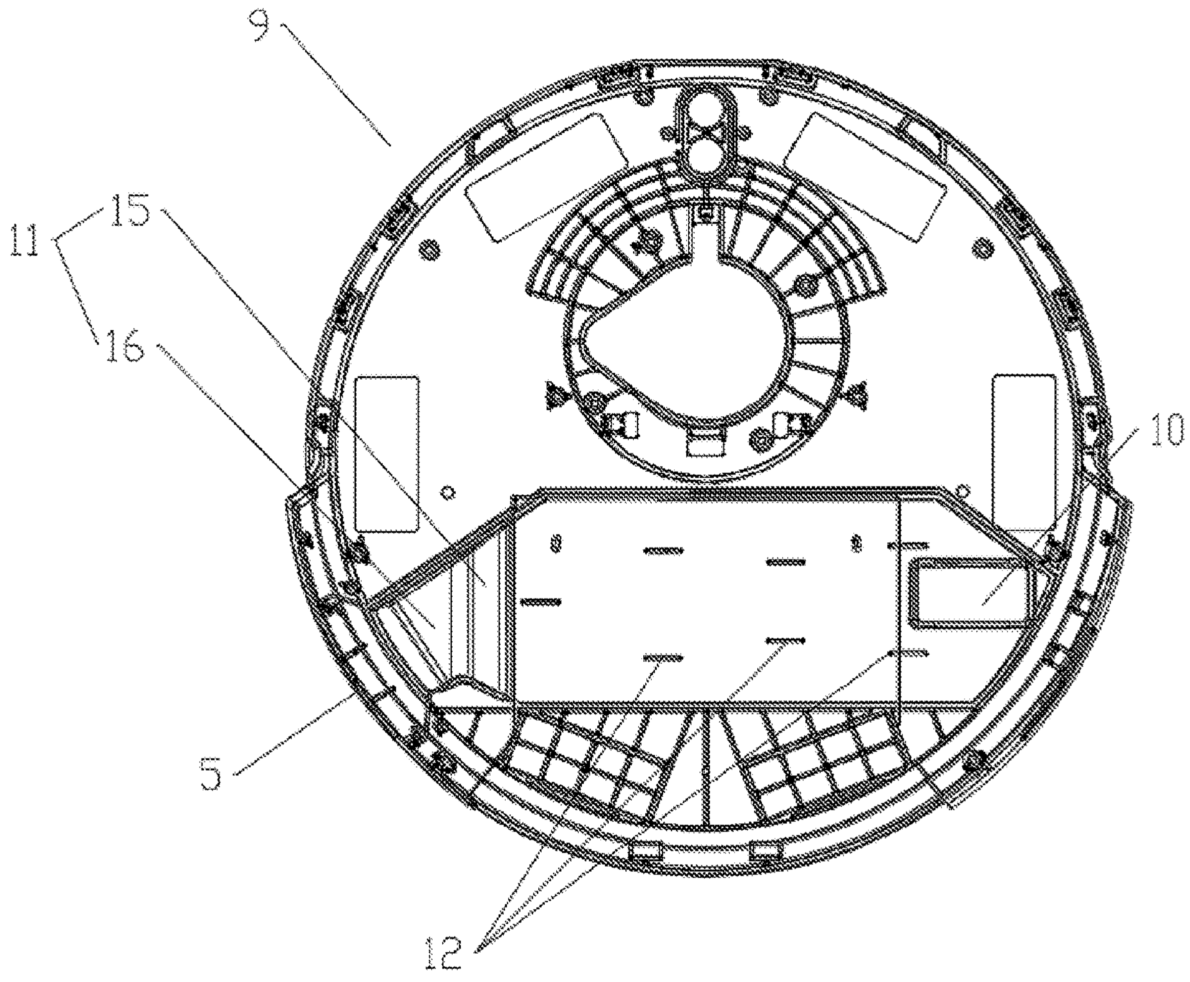
FIG. 5 is a top view of a lower housing in FIG. 4.
Figure 7:
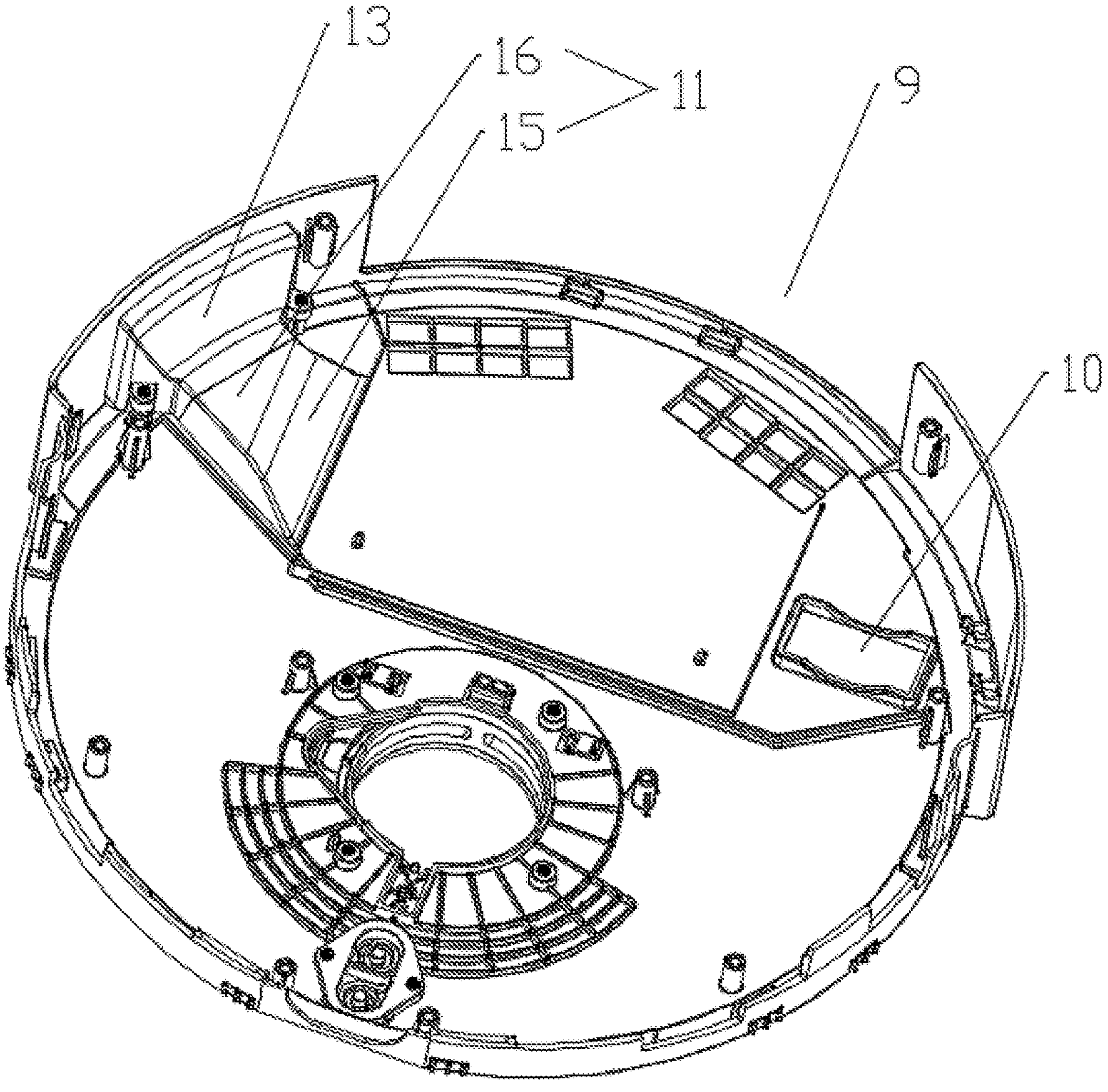
FIG. 7 is a perspective view of a lower housing of an air duct assembly according to one or more examples of the present disclosure viewed from bottom.

The downstream air duct 913 is provided with an airflow buffer 11 and an exhaust port 13. As shown in FIG. 4, FIG. 5 and FIG. 7, the lower housing 9 at the airflow buffer 11 includes a first inclined portion 15 and a second inclined portion 16 disposed successively along the airflow direction. There is a smooth transition between the first inclined portion 15 and the second inclined portion 16, and a side of the first inclined portion 15 away from the second inclined portion 16 is connected with the upstream air duct 911. Since the airflow buffer 11 has increased space relative to the upstream air duct 911, the airflow slows down after reaching the airflow buffer 11, thereby reducing an airflow impact on the exhaust port 13 and reducing noise. An angle between the first inclined portion 15 and the upper housing 8 is greater than an angle between the second inclined portion 16 and the upper housing 8. A flow rate of the airflow decreases rapidly at the first inclined portion 15, and the rate of decrease in the flow rate is reduced at the second inclined portion 16, and the airflow gradually tends to be gentle and stable, such that adjustment rate in the flow rate at each area of the downstream air duct 913 are reasonably adjusted, to reduce the exhaust noise.

Along the airflow direction, the groove 93 at the airflow buffer 11 is gradually narrowed in width, but gradually increased in height, and a cross-sectional area of a part of the downstream air duct 913 enclosed by the lower housing 9 at the airflow buffer 11 and the upper housing 8 gradually increases. Since the airflow buffer 11 has increased space relative to the upstream air duct 911, the airflow slows down after reaching the airflow buffer 11, thereby reducing the airflow impact on the exhaust port 13 and reducing noise. It should be noted that in addition to the way of narrowing the width and increasing the height of the groove 93, the cross-sectional area of the downstream air duct 913 at the airflow buffer 11 may also be gradually increased by other appropriate ways. In addition, an inner surface of the airflow buffer 11 is coated with the EPP noise reduction material.

Figure 8:
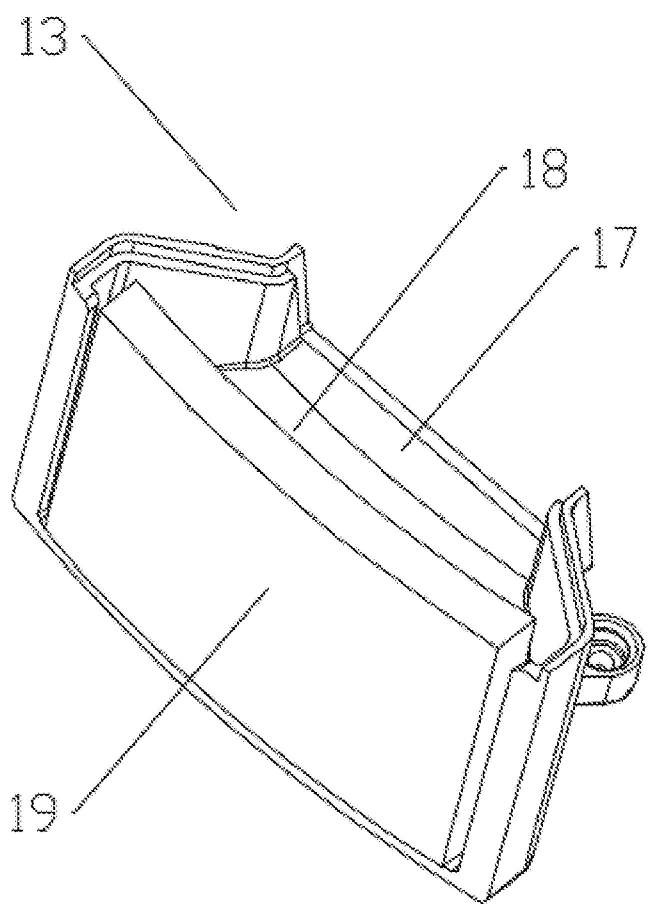
FIG. 8 is a perspective view of an exhaust port according to one or more examples of the present disclosure.
Figure 9:
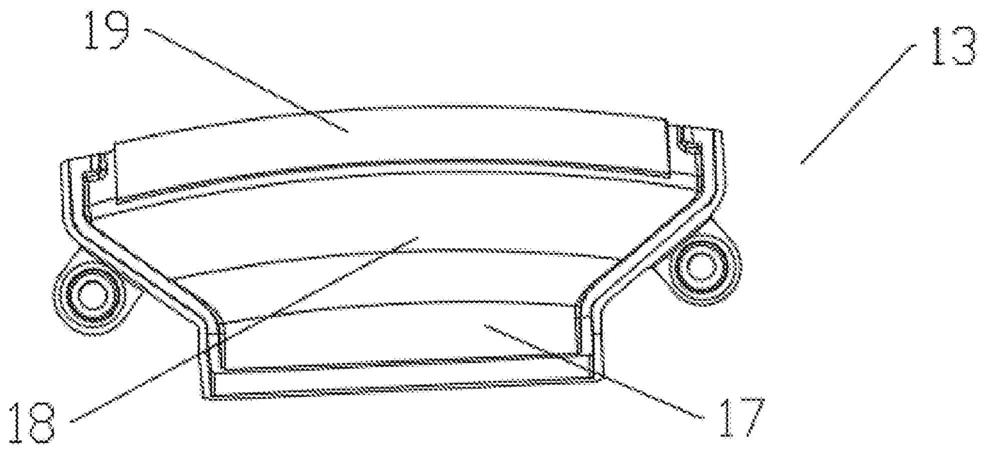
FIG. 9 is a top view of an exhaust port according to one or more examples of the present disclosure.

Referring to FIGS. 7, 8 and 9, the exhaust port 13 is horn-shaped, and an outer wall of the exhaust port 13 is fixedly connected with the lower housing 9 through two screws. The exhaust port 13 includes a third inclined portion 17 and a fourth inclined portion 18. There is a smooth transition between the third inclined portion 17 and the fourth inclined portion 18, a side of the third inclined portion 17 away from the fourth inclined portion 18 is snapped with the second inclined portion 16 of the airflow buffer 11, and a vibration-damping structure 19 is arranged at the other end of the exhaust port 13 to avoid vibration and noise caused by high-speed airflow directly passing through an exhaust hole. In an example, shown in FIG. 8, the vibration-damping structure 19 is a sponge sheet directly facing the air outlet, to avoid the noise caused by the high-speed airflow passing through the exhaust hole, and the airflow is buffered by the sponge sheet and discharged to the exhaust hole through pores on the sponge sheet and finally discharged to the outer atmosphere. The sponge sheet may further filter the dust that may remain in the exhaust airflow, to avoid the exhaust air from polluting the external environment. When the airflow impacts the air duct 91, turbulent noise may occur, and the vibration-damping structure 19 may reduce the vibration at the position of the air outlet 5 of the air duct 91 and further reduce the noise.

In addition, an inner surface of the exhaust port 13 is coated with EPP noise reduction material.

Figure 6:
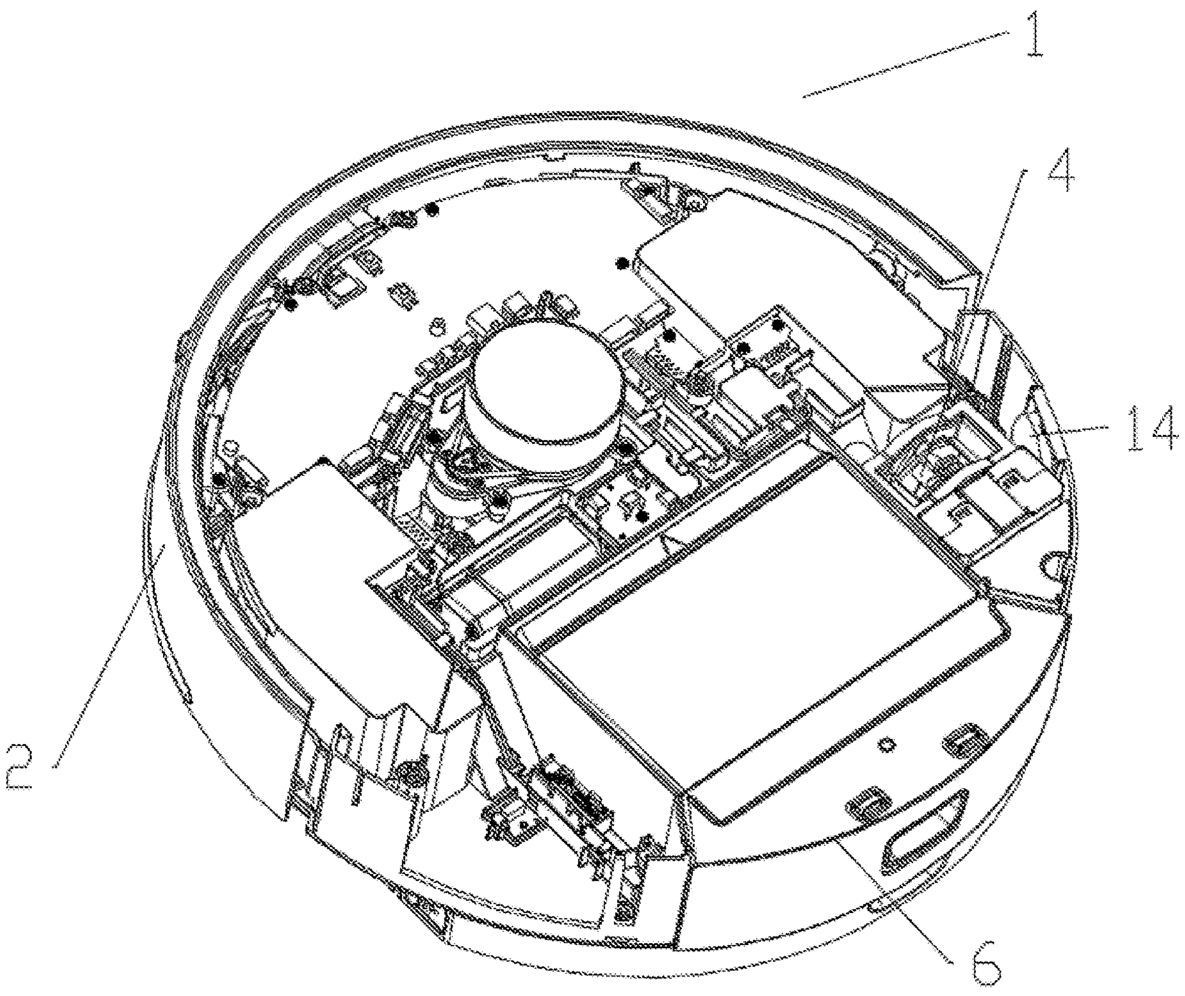
FIG. 6 is a perspective view of an autonomous cleaning device according to one or more examples of the present disclosure, in which the autonomous cleaning device is not mounted with an upper cover and an air duct assembly.

Combined with FIG. 6, the noise reduction air duct device also includes an active noise reduction 14, and the active noise reduction 14 is located close to the motor 4. The active noise reduction 14 may generate an inverted phase acoustic-wave equal to the noise of the motor 4, and then neutralize the noise to achieve active noise reduction for the noise of the motor 4.

Figure 10:
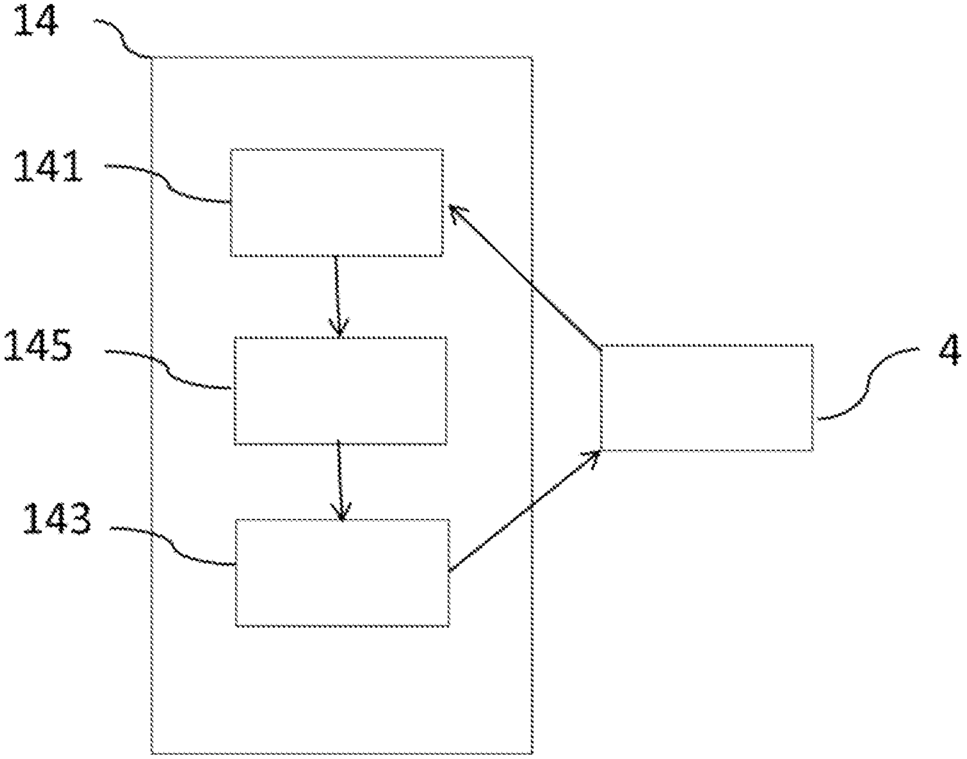
FIG. 10 is a block diagram of an active noise reduction according one or more examples of the present disclosure.

In an example, as illustrated in FIG. 10, the active noise reduction 14 includes a microphone 141, a speaker 143, and a noise elimination circuit 145. The microphone 141 collects a noise signal of the motor 4 and transmits the noise signal to the noise elimination circuit 145 in real time. The noise elimination circuit 145 controls the speaker 143 to generate an inverted acoustic-wave signal according to the received noise signal to counteract the noise of the motor 4.

Referring to FIGS. 1, 2, 3 and 6, examples of the present disclosure also provide an autonomous cleaning device, including a body 2, the above noise reduction air duct device and an upper cover 3. The body 2 is provided with a dust box 6 and a motor 4, the noise reduction air duct device is mounted on the body 2, and the upper cover 3 covers the noise reduction air duct device.

The autonomous cleaning device also includes a cleaning system, a sensing system, a control system, a driving system, an energy system and a man-machine interaction system. Major components of the autonomous cleaning device are described in detail below.

The body 2 includes a frame, a front portion, a rear portion, a chassis, and the like. The body 2 is in an approximate circular shape (both front and rear are circular), and may also be in other shapes, including but not limited to an approximate D-shape with a squared-shape in front and a circular-shape in rear.

The sensing system includes a position sensor located above the body 2, and a sensing device such as a buffer, an obstacle avoidance sensor, an infrared sensor, a magnetometer, an accelerometer, a gyroscope, and an odometer, located at the front portion of the body 2. These sensing devices provide various position information and motion state information of a machine to the control system. In an example, the position sensor includes, but is not limited to, a laser transmitter, a vision camera, a dynamic vision sensor, or a laser ranging device (LDS).

The cleaning system includes a dry cleaning portion and a wet cleaning portion. The wet cleaning portion is a first cleaning portion, and is mainly configured to wipe a surface to be cleaned (such as the ground) with a cleaning cloth containing a cleaning liquid. The dry cleaning portion is a second cleaning portion, and is mainly configured to clean solid particle pollutants on the surface to be cleaned through a structure such as a cleaning brush.

As the dry cleaning portion, the main cleaning function comes from the second cleaning portion composed of a roller brush, a dust box, a fan, an air vent and connecting components among them. The roller brush with certain interference with the ground sweeps up particles on the ground and rolls them to the front of the dust suction port between the main brush and the dust box, and then the particles are sucked into the dust box by suction gas that is generated by the fun and passes through the dust box. Dust removal capacity of a sweeper may be characterized by the dust pick up efficiency (DPU). The dust pick up efficiency DPU is affected by structure and material of the roller brush, by wind utilization rate of the air duct 91 composed of the dust suction port, the dust box 6, the fan, the air vent and the connecting components among them, and by type and power of the fan. The dry cleaning system may also include an edge brush having a rotating shaft, the rotating shaft is at an angle relative to the ground for moving debris into a cleaning area of the main brush of the second cleaning portion.

As the wet cleaning portion, the first cleaning portion mainly includes a liquid container, a cleaning cloth, and the like. The liquid container serves as a base for carrying other components of the first cleaning portion. The cleaning cloth is detachably arranged on the liquid container. Liquid in the liquid container flows to the cleaning cloth, and the cleaning cloth wipes the ground after cleaned by the roller brush and the like.

The driving system is configured to drive the body 2 and components thereon to move for automatic walking and cleaning. The driving system includes a driving wheel module. The driving system may send a drive command based on distance and angle information to operate the autonomous cleaning device to travel across the ground. The driving wheel module may control a left wheel and a right wheel synchronously. In order to control movement of the machine more accurately, it is preferred that the driving wheel module includes a left driving wheel module and a right driving wheel module, respectively, and the left driving wheel module and the right driving wheel module are opposed (arranged symmetrically) along a transverse axis defined by the body 2. In order to enable the autonomous cleaning device to move more stably or have stronger movement ability on the ground, the autonomous cleaning device may include one or more driven wheels, including but not limited to universal wheels.

The driving wheel module includes a walking wheel, a driving motor and a control circuit configured to control the driving motor. The driving wheel module may also be connected with a circuit for measuring a driving current and an odometer. The driving wheel module may be detachably connected to the body 2 to facilitate disassembly, assembly and maintenance. The driving wheel may have a biased-falling suspension system, and the biased-falling suspension system is fastened to the body 2 in a movable manner, such as rotatably attached to the body 2, and receives spring bias to be biased downward and away from the body 2. The spring bias allows the driving wheel to maintain contact with the ground and traction with a certain ground grip, and cleaning elements of the autonomous cleaning device (such as the roller brush) also contact the ground with a certain pressure.

The front portion of the body 2 may carry the buffer. During the cleaning, when the driving wheel module pushes the autonomous cleaning device to walk on the ground, the buffer detects one or more incidents along a walking path of the autonomous cleaning device via a series of trigger principles, such as light breaking principle. The autonomous cleaning device may control the driving wheel module based on the incidents, such as obstacles or walls, detected by the buffer, to make the autonomous cleaning device respond to the incidents, such as moving away from the obstacles.

Generally, during using the autonomous cleaning device, in order to prevent the autonomous cleaning device from entering restricted areas in the house, for example, areas where fragile articles are placed or water containing areas on the ground such as the toilet. In at least one example, the autonomous cleaning device for cleaning also includes a restricted area detector. The restricted area detector includes a virtual wall sensor which sets a virtual wall according to user's arrangement to define the restricted area. When detecting the virtual wall, the virtual wall sensor may control the driving wheel module to restrict the autonomous cleaning device for cleaning from crossing a boundary of the restricted area, i.e., the virtual wall, and entering the restricted area.

In addition, during using the autonomous cleaning device, in order to prevent the autonomous cleaning device from falling at places such as indoor stairs and higher steps, the restricted area detector also includes a cliff sensor which sets a boundary according to user's arrangement to define the restricted area. When detecting the boundary of the restricted area, i.e., an edge of the cliff, the cliff sensor may control the driving wheel module to restrict the autonomous cleaning device for cleaning from crossing the boundary of the restricted area, to avoid the autonomous cleaning device from falling down from the steps.

The control system is arranged on the circuit main board in the body 2, including a calculation processor, such as a central processing unit and an application processor, communicating with non-temporary memory, such as a hard disk, flash memory, random access memory. The application processor uses a positioning algorithm, such as SLAM, to draw a real-time map of an environment where the autonomous cleaning device is located, according to obstacle information fed back by a laser ranging device. In combination with the distance information and speed information fed back by the buffer, cliff sensor, ultrasonic sensor, infrared sensor, laser sensor, magnetometer, accelerometer, gyroscope odometer or other sensing devices, a current working state of the sweeper, such as crossing a threshold, moving to a carpet, being located at the cliff, the upper portion or the lower portion being stuck, and the dust box being full, being picked up and so on, is comprehensively determined. Furthermore, a specific next action strategy can also be given according to different situations, such that the work of the autonomous cleaning device may better meet owner's requirements and have better user experience. Further, the control system may plan the most efficient and reasonable cleaning path and cleaning method based on the real-time map information drawn based on SLAM, which greatly improves cleaning efficiency of the autonomous cleaning device.

The energy system includes a rechargeable battery, such as a lithium battery and a polymer battery. The rechargeable battery may be connected with a charging control circuit, a battery pack charging temperature detection circuit and a battery undervoltage monitoring circuit. The charging control circuit, the battery pack charging temperature detection circuit and the battery undervoltage monitoring circuit are then connected with a single-chip microcomputer control circuit. The machine is connected with a charging pile through a charging electrode arranged on a side or below of the machine body for charging. If a bare charging electrode is stained with dust, the plastic machine body around the electrode melts and deforms due to charge accumulation effect during the charging, and even the electrode itself is deformed and unable to continue normal charging.

The autonomous cleaning device is provided with a signal receiver at a front end to receive a signal sent by the charging pile. The signal is usually an infrared signal. In some more advanced technologies, the signal may be a graphic signal. Generally, when the autonomous cleaning device starts from the charging pile, the system remembers a location of the charging pile. Thus, when the autonomous cleaning device finishes the cleaning or the power is low, the autonomous cleaning device will control the driving wheel system to drive it to the location of the charging pile stored in its memory, and then go to the charging pile to charge.

The man-machine interaction system includes keys on a machine panel for user to select functions, and may further include a display screen and/or an indicator light and/or a speaker. The display screen, indicator light and speaker show the user a current state of the machine or functional options. The man-machine interaction system may also include a mobile client program. For a path navigation cleaning apparatus, the mobile client program may show the user a map of an environment where the autonomous cleaning device stays during moving, and a location of the machine, to provide the user with richer and humanized function items.

In order to more clearly describe behaviors of the autonomous cleaning device, the following directions are defined: the autonomous cleaning device may travel on the ground through various combinations of movements relative to the following three mutually perpendicular axes defined by the body 2: a front-rear axis X, i.e., an axis extending along a direction of a front portion and a rear portion of the body 2; a transverse axis Y, i.e., an axis perpendicular to the axis X and in the same horizontal plane as the axis X; and a central vertical axis Z, i.e., an axis perpendicular to a plane composed of the axis X and the axis Y. A forward driving direction along the front-rear axis X is marked as “forward” and a backward driving direction along the front-rear axis X is marked as “backward”. The transverse axis Y is essentially extends between the right wheel and the left wheel of the autonomous cleaning device along an axle center defined by a center point of the driving wheel module.

The autonomous cleaning device may rotate around the Y axis. When the forward part of the autonomous cleaning device tilts upward and the rearward part tilts downward, the autonomous cleaning device is “pitch up”, and when the frontward part of the autonomous cleaning device tilts downward and the rearward part tilts upward, the autonomous cleaning device is “pitch down”. In addition, the autonomous cleaning device may rotate around the Z axis. In the forward direction of the autonomous cleaning device, when the autonomous cleaning device tilts to the right of the X axis, the autonomous cleaning device is “right-turn”, and when the autonomous cleaning device tilts to the left of the X axis, the autonomous cleaning device is “left-turn”.

The dust box is mounted in an accommodating chamber at a rear portion of the machine body part in a form of mechanical latch snap-fit. When the latch is pressed, a clip is retracted, and when the latch is released, the clip sticks out to be snap-fitted in a groove 93, configured to accommodate the clip, in the accommodating chamber.

Compared with the related art, since the support noise reduction structure is provided between the upper housing 8 and the lower housing 9, the noise reduction air duct device for the autonomous cleaning device of the present disclosure may absorb the vibration of the upper housing 8 when the airflow passes through, and achieve the technical effect of reducing the noise caused by the motor.

According to a first aspect, examples of the present disclosure provide a noise reduction air duct device for an autonomous cleaning device. The autonomous cleaning device includes a body and the noise reduction air duct device, the body is provided with a motor, the noise reduction air duct device is mounted on the body; the noise reduction air duct device includes an air duct assembly, and the air duct assembly includes an upper housing, a lower housing and a support noise reduction structure made of an elastic material, the lower housing and the upper housing enclose to form an air duct, a position of the air duct corresponding to the motor defines air inlet, and a side of the air duct away from the air inlet defines an air outlet; a first end of the support noise reduction structure is fixed on the lower housing, and a second end of the support noise reduction structure abuts against a lower surface of the upper housing.

In some examples, the lower housing is fixed to the body, the lower housing defines a groove, the upper housing is mounted at an opening of the groove, and the first end of the support noise reduction structure is fixed on a bottom face of the groove.

In some examples, along a flow direction of airflow in the air duct, the air duct is divided into an upstream air duct and a downstream air duct; a plurality of support noise reduction structures are mounted in the upstream air duct, the downstream air duct is provided with an airflow buffer and an exhaust port, a first end of the airflow buffer is connected to the upstream air duct, the second end of the airflow buffer is connected to a first end of the exhaust port, and a second end of the exhaust port is located at a position of the air outlet.

In some examples, the support noise reduction structure is sheet-shaped, made of a sound deadening material and arranged along an airflow direction; and/or three or more support noise reduction structures are provided, and a number of the support noise reduction structures close to the air inlet is more than a number of the support noise reduction structures close to the downstream air duct.

In some examples, the lower housing at the airflow buffer includes a first inclined portion and a second inclined portion arranged successively along an airflow direction, the first inclined portion and the second inclined portion forms a smooth transition therebetween, and a side of the first inclined portion away from the second inclined portion is connected with the upstream air duct; an angle between the first inclined portion and the upper housing is greater than an angle between the second inclined portion and the upper housing; and/or along an airflow direction, a cross-sectional area of a part of the downstream air duct enclosed by the lower housing at the airflow buffer and the upper housing gradually increases.

In some examples, the exhaust port is horn-shaped, and includes a third inclined portion and a fourth inclined portion; the third inclined portion and the fourth inclined portion forms a smooth transition therebetween, a side of the third inclined portion away from the fourth inclined portion is snapped with the second inclined portion of the airflow buffer; and/or the second end of the exhaust port is provided with a vibration-damping structure.

In some examples, the support noise reduction structure is made of EPP noise reduction material, and an inner wall of the air duct is coated with the EPP noise reduction material; and/or a corner of the air duct is rounded for a smooth transition.

In some examples, the noise reduction air duct device further includes an active noise reduction located close to the motor, the active noise reduction is configured to generate an inversed phase acoustic-wave equal to noise of the motor, to neutralize the noise of the motor.

In some examples, the active noise reduction includes a microphone, a speaker, and a noise elimination circuit; the microphone is configured to collect a noise signal of the motor and transmit the noise signal to the noise elimination circuit in real time, the noise elimination circuit is configured to control the speaker to generate an inverted acoustic-wave according to the received noise signal.

According to a second aspect, examples of the present disclosure provide an autonomous cleaning device. The autonomous cleaning device includes the above noise reduction air duct device.

In the description of the present disclosure, it should be understood that the terms such as "first" and "second" are used herein for purposes of description and are not intended to indicate or imply relative importance or significance or to imply the number of indicated technical features. Thus, the feature defined by "first" and "second" may comprise one or more of this feature. In the description of the present invention, "a plurality of" means two or more than two, unless specified otherwise.

In the present disclosure, it should be noted that, unless specified otherwise, terms "mounted", "coupled", "connected" and "fixed" should be understood broadly, for example, may be fixed connections, detachable connections, or integral connections; may also be mechanical or electrical connections or intercommunications; may also be direct connections or indirect connections via intervening structures; may also be inner communications or interactions of two elements, which may be understood by those skilled in the related art according to specific situations.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "over", "above" and "on" the second feature may be that the first feature is directly above or obliquely above the second feature, or merely be that the first feature has a level higher than the second feature. The first feature "beneath", "below" and "under" the second feature may be that the first feature is directly below or obliquely below the second feature, or merely be that the first feature has a level less than the second feature.

Reference throughout this specification to terms "an embodiment", "some embodiments", "an example", "a specific example" or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A noise reduction air duct device for an autonomous cleaning device, comprising:

an upper housing;

a lower housing; and a support noise reduction structure, wherein the autonomous cleaning device comprises a body and a motor mounted on the body, the noise reduction air duct device is configured to be mounted on the body; and wherein the support noise reduction structure is made of an elastic material, the lower housing and the upper housing enclose to form an air duct, the air duct comprises an air inlet at a position corresponding to the motor, and the air duct comprises an air outlet at a side of the air duct away from the air inlet; and the support noise reduction structure comprises a first end fixed on the lower housing, and a second end abutting against a lower surface of the upper housing, wherein along an airflow direction in the air duct, the air duct is divided into an upstream air duct and a downstream air duct;

a plurality of support noise reduction structures are mounted in the upstream air duct, the downstream air duct comprises an airflow buffer and an exhaust port, a first end of the airflow buffer is connected to the upstream air duct, a second end of the airflow buffer is connected to a first end of the exhaust port, and a second end of the exhaust port is located at a position of the air outlet; and wherein three or more support noise reduction structures are provided, and a number of the support noise reduction structures close to the air inlet is greater than a number of the support noise reduction structures close to the downstream air duct.

2. The noise reduction air duct device according to claim 1, wherein the lower housing is configured to be fixed to the body, the lower housing comprises a groove, the upper housing is mounted at an opening of the groove, and the first end of the support noise reduction structure is fixed on a bottom face of the groove.

3. The noise reduction air duct device according to claim 1, wherein the support noise reduction structure is sheet-shaped, made of a sound deadening material and arranged along the airflow direction.

4. The noise reduction air duct device according to claim 3, wherein three or more support noise reduction structures are provided, and a number of the support noise reduction structures close to the air inlet is greater than a number of the support noise reduction structures close to the downstream air duct.

5. The noise reduction air duct device according to claim 1, wherein along the airflow direction, a cross-sectional area of a part of the downstream air duct enclosed by the lower housing at the airflow buffer and the upper housing gradually increases.

6. The noise reduction air duct device according to claim 1, wherein the support noise reduction structure is made of Expanded Polypropylene (EPP) noise reduction material, and an inner wall of the air duct is coated with the EPP noise reduction material.

7. The noise reduction air duct device according to claim 6, wherein a corner of the air duct is rounded for a smooth transition.

8. The noise reduction air duct device according to claim 1, wherein a corner of the air duct is rounded for a smooth transition.

9. The noise reduction air duct device according to claim 1, wherein the noise reduction air duct device further comprises an active noise reduction located close to the motor, the active noise reduction is configured to generate an inverted phase acoustic-wave equal to noise of the motor, to neutralize the noise of the motor.

10. The noise reduction air duct device according to claim 9, wherein the active noise reduction comprises a microphone, a speaker, and a noise elimination circuit;

the microphone is configured to collect a noise signal of the motor and transmit the noise signal to the noise elimination circuit in real time, the noise elimination circuit is configured to control the speaker to generate an inverted acoustic-wave signal according to the received noise signal.

11. The noise reduction air duct device according to claim 1, wherein a cross section of the upstream air duct perpendicular to the airflow direction is strip-shaped.

12. The noise reduction air duct device according to claim 1, wherein along the airflow direction, the groove at the airflow buffer is gradually narrowed in width, and gradually increased in height.

13. A noise reduction air duct device for an autonomous cleaning device, comprising:

an upper housing;

a lower housing; and a support noise reduction structure, wherein the autonomous cleaning device comprises a body and a motor mounted on the body, the noise reduction air duct device is configured to be mounted on the body; and wherein the support noise reduction structure is made of an elastic material, the lower housing and the upper housing enclose to form an air duct, the air duct comprises an air inlet at a position corresponding to the motor, and the air duct comprises an air outlet at a side of the air duct away from the air inlet; and the support noise reduction structure comprises a first end fixed on the lower housing, and a second end abutting against a lower surface of the upper housing, wherein along an airflow direction in the air duct, the air duct is divided into an upstream air duct and a downstream air duct;

a plurality of support noise reduction structures are mounted in the upstream air duct, the downstream air duct comprises an airflow buffer and an exhaust port, a first end of the airflow buffer is connected to the upstream air duct, a second end of the airflow buffer is connected to a first end of the exhaust port, and a second end of the exhaust port is located at a position of the air outlet; and wherein the lower housing at the airflow buffer comprises a first inclined portion and a second inclined portion disposed successively along an airflow direction, the first inclined portion and the second inclined portion forms a smooth transition therebetween, and a side of the first inclined portion away from the second inclined portion is connected with the upstream air duct; an angle between the first inclined portion and the upper housing is greater than an angle between the second inclined portion and the upper housing.

14. The noise reduction air duct device according to claim 13, wherein along the airflow direction, a cross-sectional area of a part of the downstream air duct enclosed by the lower housing at the airflow buffer and the upper housing gradually increases.

15. The noise reduction air duct device according to claim 13, wherein the exhaust port is horn-shaped, and comprises a third inclined portion and a fourth inclined portion; and the third inclined portion and the fourth inclined portion forms a smooth transition therebetween, a side of the third inclined portion away from the fourth inclined portion is snapped with the second inclined portion of the airflow buffer.

16. The noise reduction air duct device according to claim 15, wherein the second end of the exhaust port is provided with a vibration-damping structure.

17. The noise reduction air duct device according to claim 13, wherein the second end of the exhaust port is provided with a vibration-damping structure.

18. An autonomous cleaning device, comprising:

a body;

a motor mounted on the body; and a noise reduction air duct device mounted on the body, the noise reduction air duct device comprising:

an upper housing;

a lower housing; and a support noise reduction structure, wherein the support noise reduction structure is made of an elastic material, the lower housing and the upper housing enclose to form an air duct, the air duct comprises an air inlet at a position corresponding to the motor, and the air duct comprises an air outlet at a side of the air duct away from the air inlet; and the support noise reduction structure comprises a first end fixed on the lower housing, and a second end abutting against a lower surface of the upper housing;

wherein along an airflow direction in the air duct, the air duct is divided into an upstream air duct and a downstream air duct;

a plurality of support noise reduction structures are mounted in the upstream air duct, the downstream air duct comprises an airflow buffer and an exhaust port, a first end of the airflow buffer is connected to the upstream air duct, a second end of the airflow buffer is connected to a first end of the exhaust port, and a second end of the exhaust port is located at a position of the air outlet; and wherein three or more support noise reduction structures are provided, and a number of the support noise reduction structures close to the air inlet is greater than a number of the support noise reduction structures close to the downstream air duct.

* * * * *